(12) United States Patent
Carlson et al.

(10) Patent No.: US 7,627,314 B2
(45) Date of Patent: Dec. 1, 2009

(54) CALL HANDLING SCHEME TO REDUCE ROAMING CHARGES

(75) Inventors: Steven I. Carlson, Kenmore, WA (US); Scott E. Riffe, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 10/867,957

(22) Filed: Jun. 14, 2004

(65) Prior Publication Data
US 2005/0164702 A1 Jul. 28, 2005

Related U.S. Application Data

(60) Provisional application No. 60/539,780, filed on Jan. 27, 2004.

(51) Int. Cl.
*H04Q 7/20* (2006.01)

(52) U.S. Cl. .................. 455/432.1; 455/428; 455/433; 455/435.1

(58) Field of Classification Search ............ 455/432.1, 455/432.3, 433, 428
See application file for complete search history.

(56) References Cited

U.S. PATENT DOCUMENTS 6,473,611 B2 * 10/2002 Hurme ..................... 455/410
2005/0250493 A1 * 11/2005 Elkarat et al. ............ 455/432.1

* cited by examiner

*Primary Examiner*—Patrick N Edouard
*Assistant Examiner*—Dai A Phuong
(74) *Attorney, Agent, or Firm*—Moazzam & Assoc, LLC (57) ABSTRACT

A second switch receives an indication from a roaming network that a call forwarded by the roaming network has been dropped by the roaming network, and in response to receiving the indication, forwards the call from a first switch.

12 Claims, 7 Drawing Sheets

CALL HANDLING SCHEME TO REDUCE ROAMING CHARGES

PRIORITY CLAIM

Priority is hereby claimed to the U.S. provisional application for patent entitled CALL HANDLING SCHEME TO REDUCE ROAMING CHARGES, having application No. 60/539,780, filed on Jan. 27, 2004.

TECHNICAL FIELD

The present disclosure relates to handling calls to roaming subscribers.

BACKGROUND

Wireless telephones are devices capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

A mobile device, also called mobile equipment, is a portable communication device that typically, but not necessarily, is also a wireless device. Laptop computers are examples of mobile devices. A "subscriber" represents one or more persons or entities (corporations, partnerships, agents, operators, etc.) with access privileges to a network. A subscriber may be or represent a single person, or may represent more than one person. Typically the subscriber is the operator of a mobile device.

A subscriber may enter into contractual arrangements with a network operator for access rights to the operator's network (s). Networks of this operator are the subscriber's "home networks." Networks other than the home networks of the subscriber are "roaming networks." A subscriber may gain access to roaming networks to make and receive communications, however, such access is typically provided on a per-usage basis (as opposed to a subscription basis common on home networks) and at an additional charge. Such additional charges are "roaming charges".

One situation in which roaming charges may occur involves call forwarding. When a subscriber is roaming, calls to the subscriber may be forwarded conditionally when the subscriber's mobile device is busy (forward busy), or does not answer (forward no-answer), or rejects the incoming call (e.g. forward do-not-disturb). An incoming call is routed through the subscriber's home network, from which point the call is routed to the roaming network that is currently providing access to the subscriber. The roaming network then routes the call back to the home network, to a specified forwarding number. The subscriber thus incurs charges from both the home network and the roaming network, even though they don't answer the call. Furthermore, important call information may be lost by routing through the roaming network in this fashion. This can create problems in certain situations, such as when the call is forwarded to a voice mail system (VMS). Without certain call information, the VMS may not have the capability to intelligently select a voice mail box for the called party.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Herein, software is distinguished from logic in that software does not comprise hardware elements, whereas logic may be formed from combinations of software and hardware.

Figure 1:
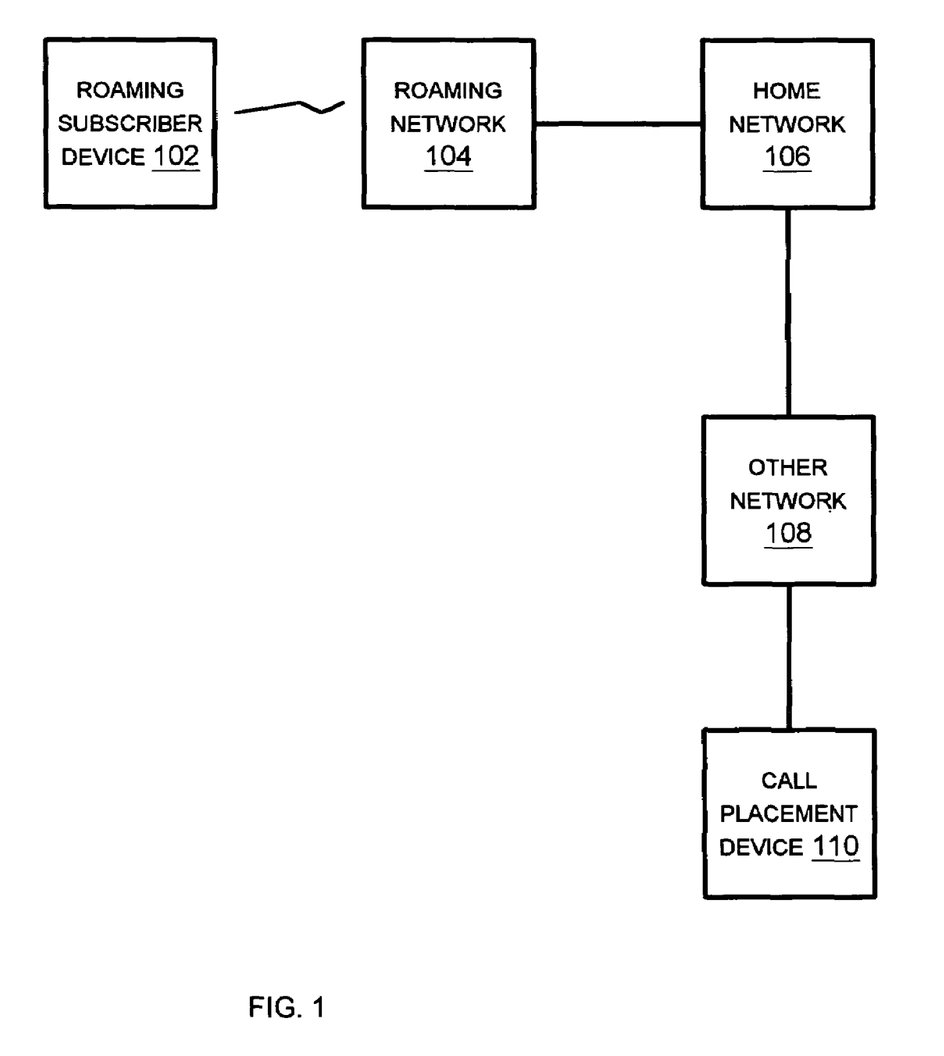
FIG. 1 is a block diagram of an embodiment of a communication arrangement.

FIG. 1 is a block diagram of an embodiment of a communication arrangement. A roaming subscriber device 102 communicates via a roaming network 104. The roaming network 104 is coupled to the subscriber's home network 106, often via electrical and/or optical "trunk" lines (high capacity data communication lines). A call placement device 110 places calls to the roaming subscriber device 102 via some other network 108 that is coupled to the subscriber's home network 106. The other network 108 routes the call to the home network 106, which routes the call the roaming network 104. The roaming network 104 routes the call to the roaming subscriber device 102. If the subscriber is busy, or does not answer, or rejects the call, the roaming network 104 forwards the call back to the home network 106 according to the subscriber's call forwarding information.

Figure 2:
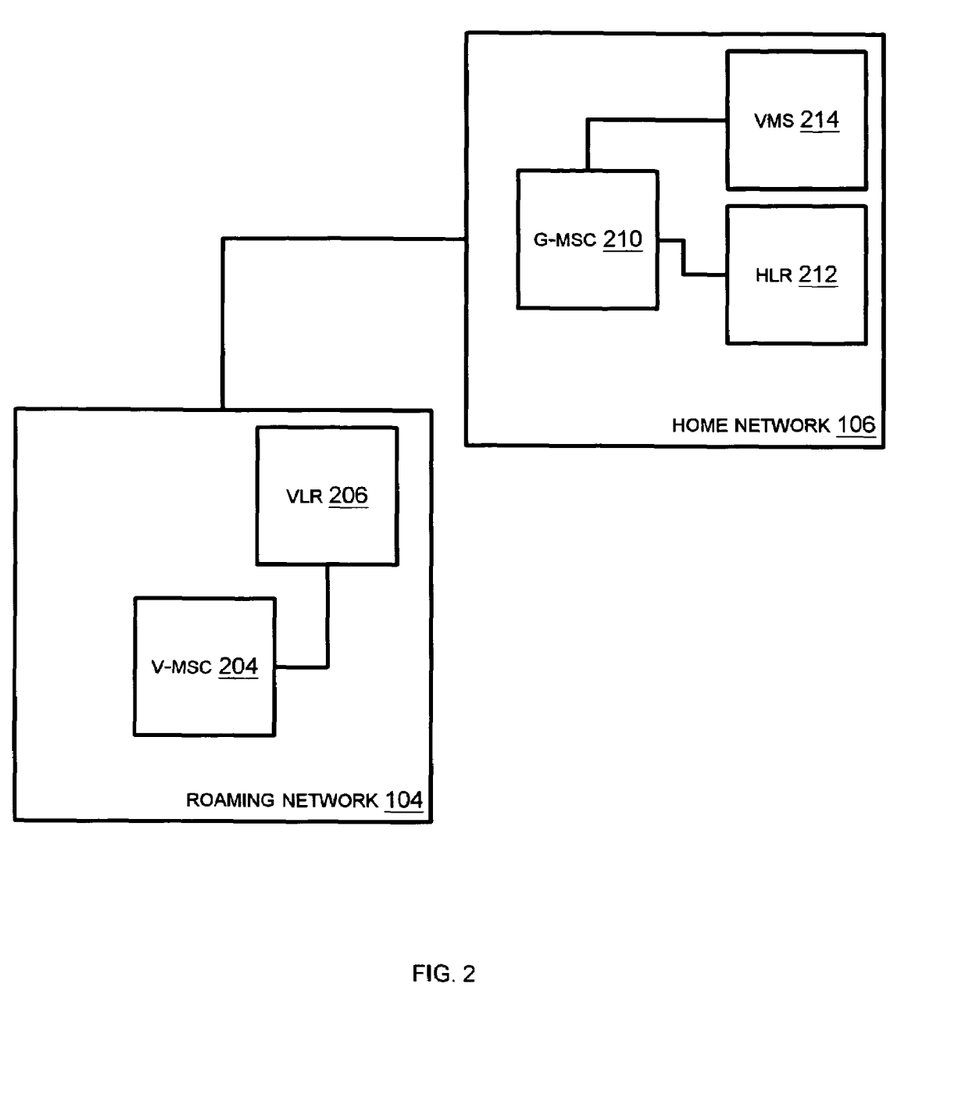
FIG. 2 is a block diagram of an embodiment of home and roaming networks.

FIG. 2 is a block diagram of an embodiment of home and roaming networks. The roaming network 104 comprises a Mobile Switching Center (MSC) 204 (herein termed the v-MSC 204 to distinguish from other MSCs in the arrangement) and a Visitor Location Registry (VLR) 206. The v-MSC 204 is coupled to the VLR 206. The home network 106 comprises an MSC 210 (herein termed the g-MSC to distinguish from other MSCs in the arrangement), a Home Location Registry (HLR) 212, and a Voice Mail System (VMS) 214. The g-MSC 210 is coupled to HLR 212 and to the VMS 214. Of course, each network comprises many other components as well that have been omitted so as not to obscure the present description.

An MSC is a digital switching mechanism that routes communications and manages the network. In GPRS networks, GPRS support nodes (GSNs) such as Switching GSNs (SG-SNs) may provide switching operations similar to those provided by the MSC in GSM networks. There can be many switches in a communication network, each responsible for the signaling required to set up, maintain, and terminate connections to mobile devices within the geographical area served by the switch.

The HLR 212 provides a central location for subscriber information. The HLR 212 may comprise certain dynamic or temporary subscriber data such as current Location Area (LA) of the subscriber's mobile station and the subscriber's Mobile Station Roaming Number (MSRN). Subscriber-related data is recorded in the HLR 212 from which billing and administrative information is extracted when needed by the cellular service provider. Some wireless networks have a single HLR 212 that serves all subscribers; others have multiple HLRs.

The v-MSC 204 uses the VLR 206 to manage the wireless devices that are currently roaming in the area controlled by the v-MSC 204. The VLR 206 stores information such as the International Mobile Subscriber Identity (IMSI), authentication data, conditional forwarding information, and telephone number of roaming wireless devices. The VLR 206 may obtain and comprise subscriber information, such as information about the services to which a roaming wireless device is entitled, from an HLR 212 of the home network 106.

Figure 3:
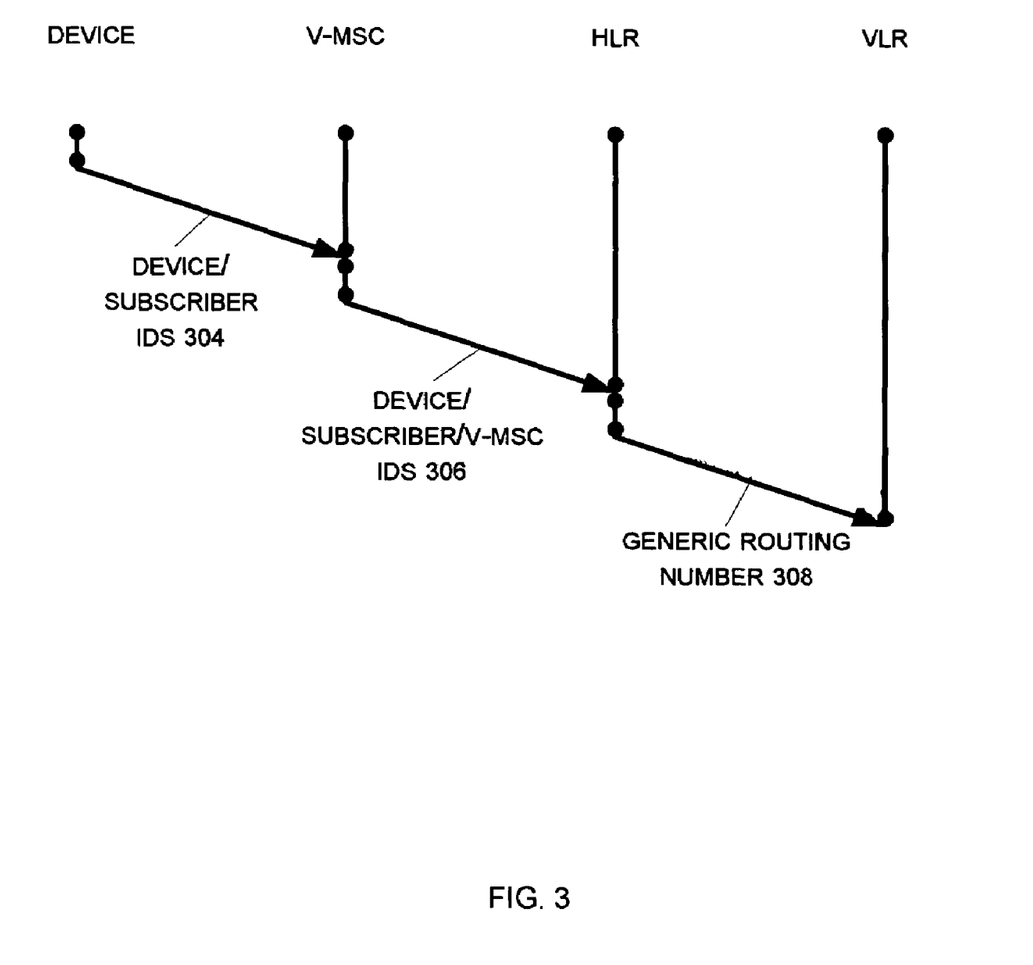
FIG. 3 is an action diagram of an embodiment of call forwarding registration on a roaming network.

FIG. 3 is an action diagram of an embodiment of call forwarding registration on a roaming network. At 302 the roaming device enters the coverage area of the roaming network. At 304 the roaming device provides device/subscriber identifications to the v-MSC. An example of a device identifier is the International Mobile Subscriber Identity (IMSI) for the subscriber. An example of a device identifier is an International Mobile Equipment Identity (IMEI). At 306 the v-MSC provides the device/subscriber identifications, along with an identification of the v-MSC itself, to the HLR. An example of a v-MSC identifier is an E.164 address for the v-MSC. The GSM specifications provided by the 3GPP organization provide more details on device, subscriber, and equipment identifiers.

The HLR does not provide the subscribers conditional call forwarding numbers to the VLR. Instead, at 308, the HLR provides generic (e.g. predetermined without regard to a particular subscriber's preferences) call forwarding routing information to the VLR.

Figure 4:
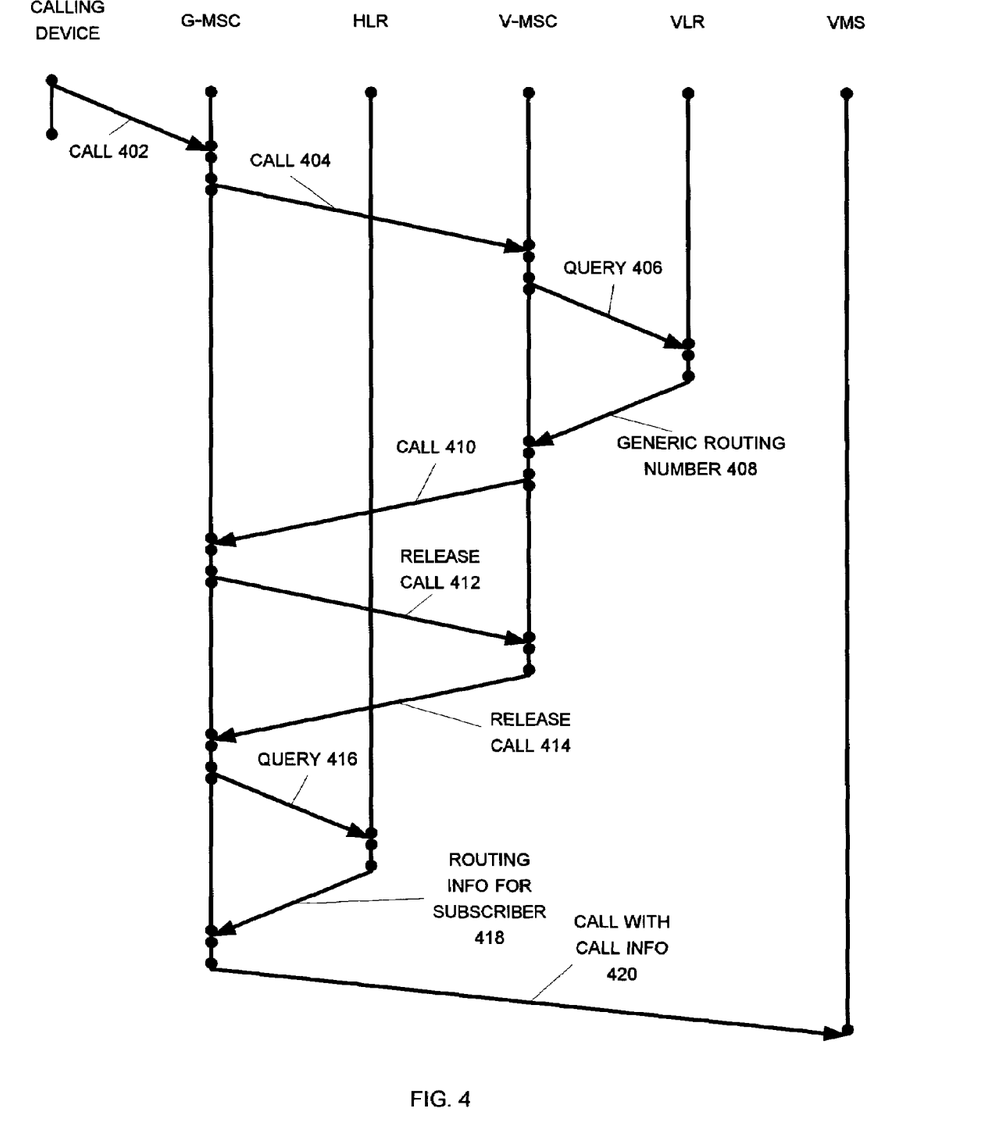
FIG. 4 is an action diagram of an embodiment of call forward handling.

FIG. 4 is an action diagram of an embodiment of call forward handling. At 402 the calling device provides a call to the g-MSC, and because the called party is roaming, the g-MSC provides the call to the v-MSC at 404. When the called party is busy, does not answer, or rejects the call, or if the call cannot be completed for other reasons, at 406 the v-MSC provides a query to the VLR for call forwarding information. At 408 the VLR provides the generic routing number to the v-MSC.

Figure 5:
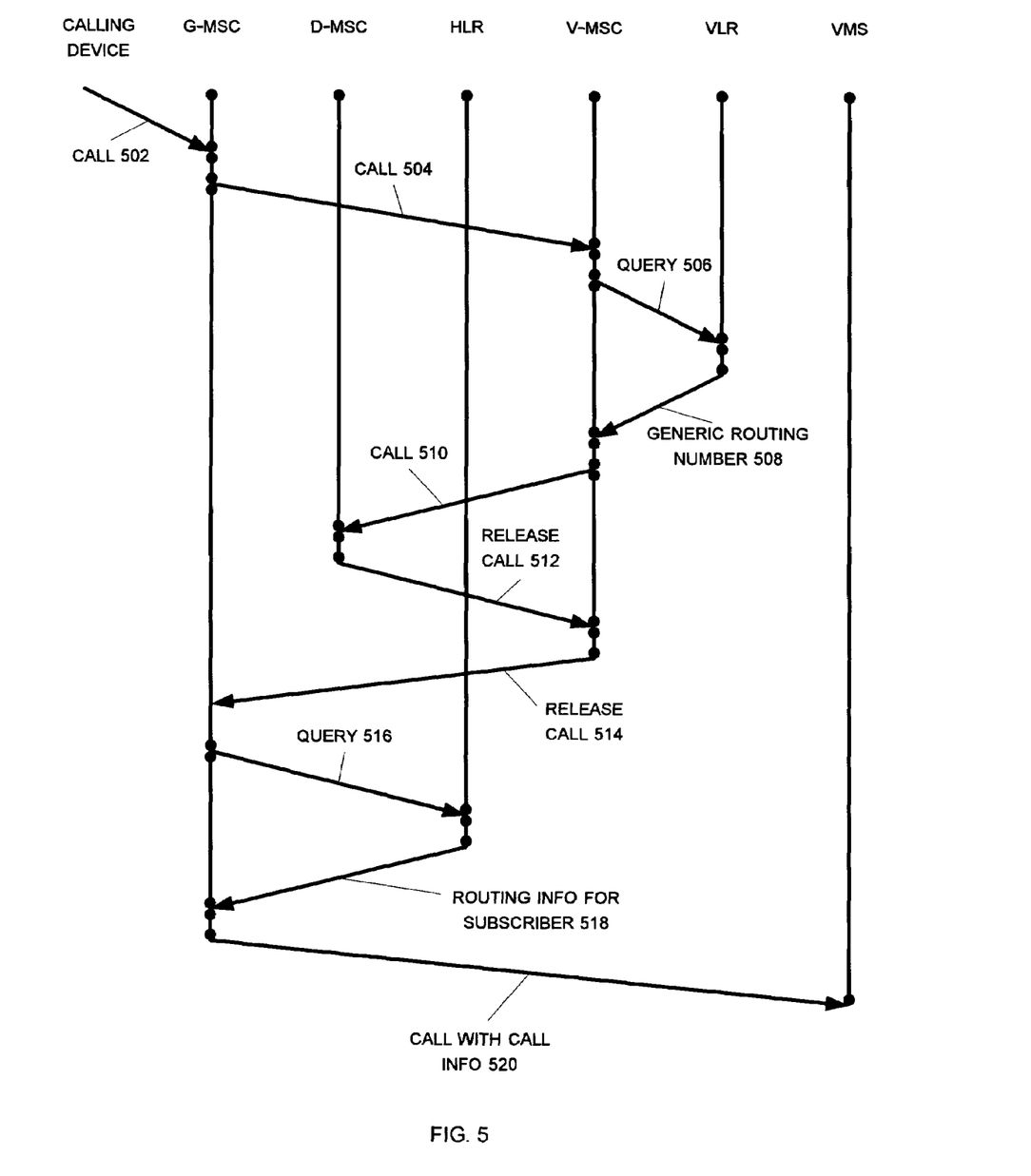
FIG. 5 is an action diagram of an embodiment of call forward handling.

The generic routing number is selected to cause the call to be routed back to the g-MSC (or another MSC of the home network—see FIG. 5). Thus, by applying the generic routing number, at 410 the v-MSC provides the call back to the g-MSC. At 412 the g-MSC releases the call from the v-MSC. In other words, the g-MSC comprises logic to react to receiving calls to the generic routing number by releasing those calls. Due to the call release, at 414 the v-MSC provides a call release indication to the g-MSC. At 416 the g-MSC queries the HLR to provide call forwarding routing information for the subscriber. In other words, the g-MSC comprises logic to identify releases for unanswered calls delivered to roaming networks, and in response to such releases queries the HLR. The HLR provides the subscriber's forwarding information at 418. At 420 the g-MSC provides the call, along with detailed call information, to the VMS (presuming that the VMS is identified as the forwarding target for unanswered calls). A voice mail box may be selected according to the detailed call information available within the home network, information not available within the roaming network.

FIG. 5 is an action diagram of an embodiment of call forward handling. At 502 the calling device provides a call to the g-MSC, and because the called party is roaming, the g-MSC provides the call to the v-MSC at 504. When the called party is busy, does not answer, or rejects the call, or if the call cannot be completed for other reasons, at 506 the v-MSC provides a query to the VLR for call forwarding information. At 508 the VLR provides the generic routing number to the v-MSC.

The generic routing number is selected to cause the call to be routed back to the D-MSC (an MSC other than the g-MSC within the home network selected to receive calls to the generic routing number). Thus, by applying the generic routing number, at 510 the v-MSC provides the call back to the d-MSC. At 512 the d-MSC releases the call from the v-MSC. In other words, the d-MSC comprises logic to react to receiving calls to the generic routing number by releasing those calls. Due to the call release, at 514 the v-MSC provides a call release indication to the g-MSC. At 516 the g-MSC queries the HLR to provide call forwarding routing information for the subscriber. In other words, the g-MSC comprises logic to identify releases for unanswered calls delivered to roaming networks, and in response to such releases queries the HLR. The HLR provides the subscriber's forwarding information at 518. At 520 the g-MSC provides the call, along with detailed call information, to the VMS (presuming that the VMS is identified as the forwarding target for unanswered calls). A voice mail box may be selected according to the detailed call information available within the home network, information not available within the roaming network.

Figure 6:
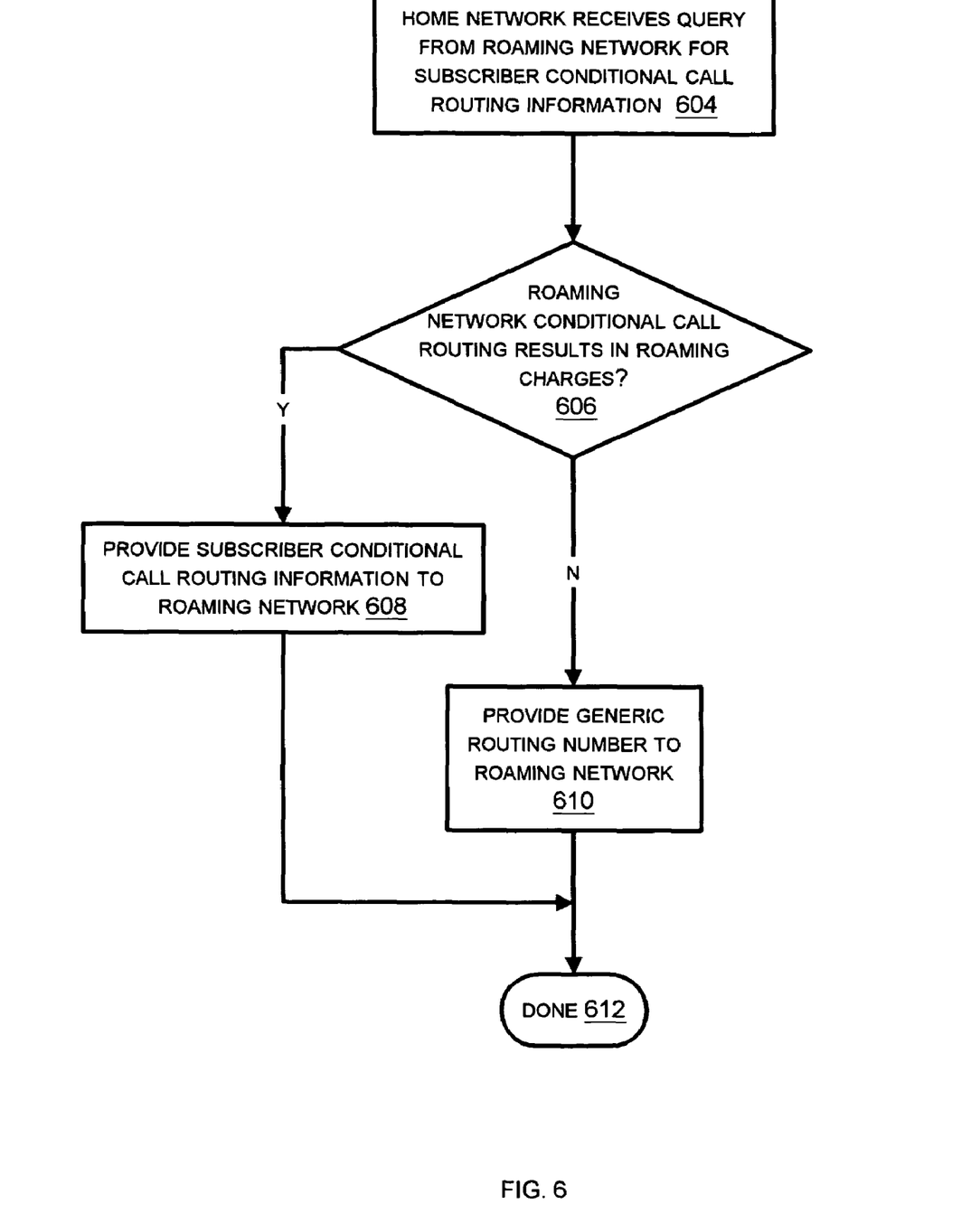
FIG. 6 is a flow chart of an embodiment of call forwarding registration on a roaming network.

FIG. 6 is a flow chart of an embodiment of call forwarding registration on a roaming network. At 604 the home network receives a query from the roaming network for subscriber conditional call routing information. If at 606 it is determined that conditional call routing for the roaming network does not result in roaming charges, the subscriber's conditional call routing information (e.g. call forwarding information that is specific to the subscriber) is provided to the roaming network 608.

One manner of making such a determination is to examine the v-MSC id, e.g. applying the E.164 address of the v-MSC to determine whether providing the v-MSC with generic call forwarding information will result in cost savings to the called party.

If at 606 it is determined that conditional call routing results in roaming charges, the generic routing number is provided to the roaming network 610. It may also be desirable, before providing the generic routing information, to determine whether the called party's call forwarding information is the same for a plurality of conditions, e.g. whether the call forwarding information is the same for forward busy, forward no-answer, and forward do-not-disturb. Otherwise it may not be possible to intelligently route unanswered calls that are released by the roaming network. At 612 the process concludes.

Figure 7:
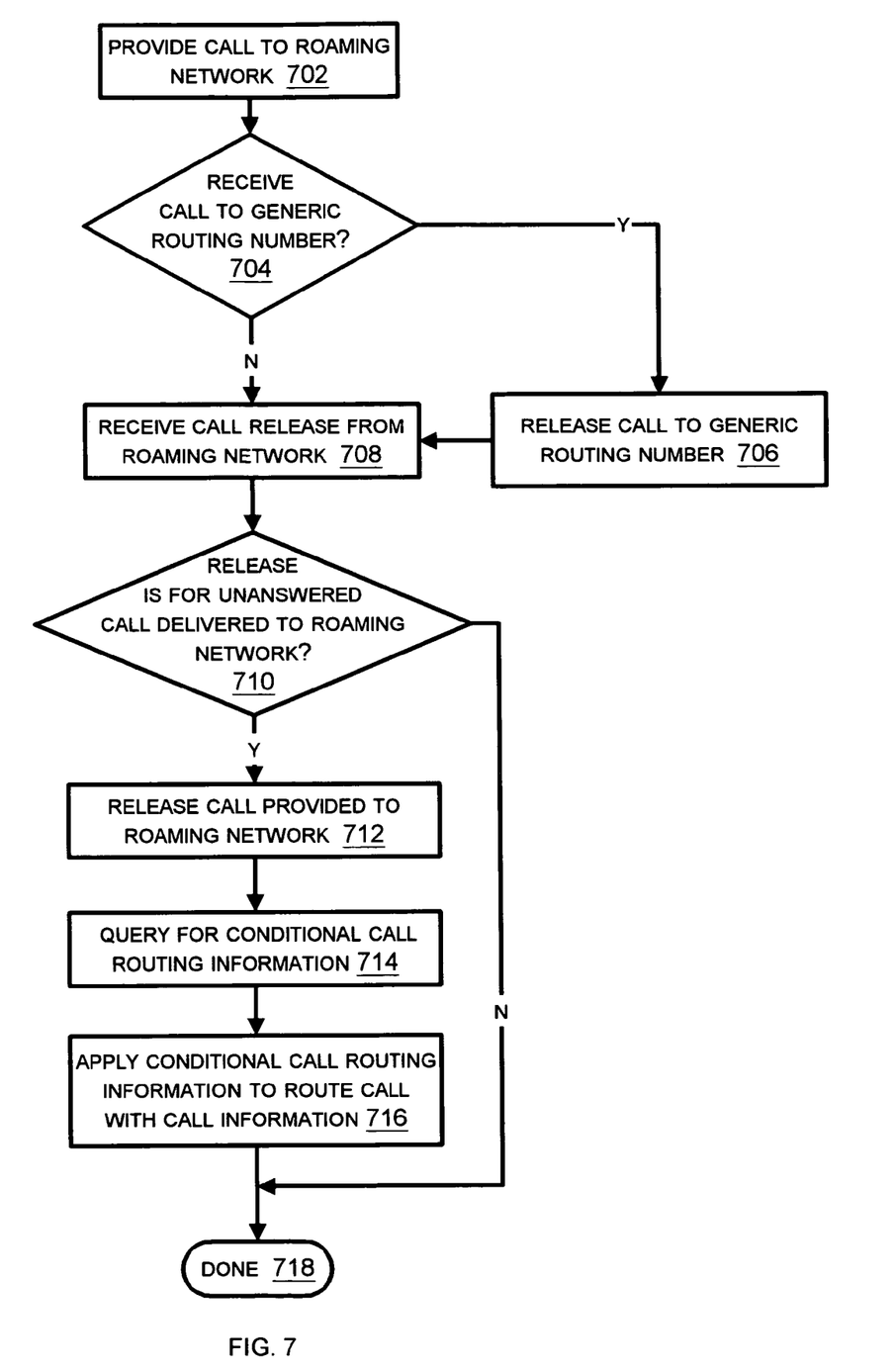
FIG. 7 is a flow chart of an embodiment of call forward handling.

FIG. 7 is a flow chart of an embodiment of call forward handling. At 702 the call is provided to the roaming network. If at 704 a call is received to the generic routing number, the call to the generic routing number is released at 706. At 708 a call release is received from roaming network. If at 710 it is determined that the release is not for an unanswered call delivered to the roaming network, the process concludes at 718 (the g-MSC may release the call). If at 710 it is determined that the release is for an unanswered call delivered to the roaming network, the call provided to the roaming network is released at 712. At 714 a query is provided for conditional call routing information, and at 716 the conditional call routing information is applied to route call according to any detailed call information that may be available in the home network. The conditional call routing information may be obtained from a subscriber record stored by a home location registry of the home network. At 718 the process concludes.

Various network elements described herein (e.g. switches, registries) may be implemented as processing devices, e.g. devices comprising at least one processor and logic to affect the operation of the processor. For example, a switch may comprise a processor and logic to implement all or portions of the processes described herein. Likewise, a registry (such as a home or visitor location registry) may comprise a processor and logic to implement all or portions of the processes described herein.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method of forwarding a call while reducing roaming charges, the method comprising:
   providing a roaming network with generic call forwarding information;
   signaling the roaming network to drop calls forwarded in accordance with the generic call forwarding information;
   receiving, at a second switch, an indication from the roaming network that a call forwarded by the roaming network has been dropped by the roaming network; wherein the roaming network initiated a drop by forwarding the call to a generic number of a first switch through a Visitor Location Registry (VLR) of the roaming network, based upon the generic call forwarding information; and
   in response to receiving the indication, forwarding the call from the first switch,
   wherein the generic call forwarding information is predetermined without a particular subscriber's preferences.

2. The method of claim 1, further comprising:
   receiving the call at the first switch;
   providing the call from the first switch to the roaming network;
   receiving the call forwarded from the roaming network at the second switch;
   the second switch signaling the roaming network to drop the call; the first switch receiving the indication from the roaming network that the call has been dropped without being answered; and
   the first switch forwarding the call.

3. The method of claim 1, further comprising:
   receiving a query for call forwarding information for a roaming subscriber;
   determining whether calls to the roaming subscriber should be forwarded according to the generic call forwarding information;
   when calls to the roaming subscriber should be forwarded according to the generic call forwarding information, providing the generic call forwarding information in response to the query; and
   otherwise providing in response to the query call forwarding information that is specific to the subscriber.

4. The method of claim 3, further comprising:
   the call forwarding information comprising a routing number to the second switch.

5. The method of claim 3, further comprising:
   the routing number the same for two or more of forward no answer, forward busy, and forward do-not-disturb.

6. A method of forwarding a call while reducing roaming charges, the method comprising:
   a switch of a home network receiving a call; and
   the switch signaling a roaming network to drop the call when the call has been routed from the roaming network according to a predetermined generic routing number provided to the roaming network by the home network, wherein the roaming network initiates a drop by forwarding the call to a generic number of another switch through a Visitor Location Registry (VLR) of the roaming network based upon the generic call forwarding information, the another switch forwarding the call to the switch in response to an indication that the roaming network has dropped the call, the generic routing number being part of generic call forwarding information predetermined without a particular subscriber's preferences.

7. A method of forwarding a call while reducing roaming charges, the method comprising:
a switch of a home network providing a call to a roaming network;
the switch receiving an indication from the roaming network that the call was dropped through forwarding of the call from the roaming network to a generic number linked to another switch through a Visitor Location Registry (VLR) of the roaming network based upon the generic call forwarding information, the generic number provided to the roaming network from a home location register along with generic call forwarding information, the generic call forwarding information being predetermined without a particular subscriber's preferences, the generic call forwarding information including a signal to the roaming network to drop calls forwarding in accordance with the generic call forwarding information, the another switch forwarding the call to the switch in response to the indication that the roaming network has dropped the call; and
when the call was dropped by the roaming network without being answered, the switch forwarding the call according to a called party's call forwarding information.

8. The method of claim 7, further comprising:
the switch obtaining the called party's call forwarding information from a subscriber record stored by a home location registry.

9. The method of claim 7, further comprising:
when the call was dropped by the roaming network after being answered, the switch dropping the call.

10. A switch for forwarding a call while reducing roaming charges, the method comprising:
a processor; and
logic that, when applied to the processor, results in the switch signaling a roaming network to drop a call when the call has been routed from the roaming network to the switch in accordance with a predetermined generic routing number provided to the roaming network in response to a request from the roaming network for conditional call forwarding information for a called party, wherein the roaming network initiates a drop by forwarding the call to a generic number of another switch through a Visitor Location Registry (VLR) of the roaming network based upon the generic call forwarding information, the another switch forwarding the call to the switch in response to an indication that the roaming network has dropped the call, the generic number provided to the roaming network from a home location register along with generic call forwarding information, the generic call forwarding information being predetermined without a particular subscriber's preferences.

11. A switch for forwarding a call while reducing roaming charges, the method comprising:
a processor; and
logic that, when applied to the processor, results in the switch forwarding a call according to a called party's call forwarding information, when the switch provided the call to a roaming network, and the switch receives an indication through a generic number that the call was dropped by the roaming network, and when the call was dropped by the roaming network without being answered, the logic including generic call forwarding information including a signal to the roaming network to drop calls forwarded in accordance with generic call forwarding information, wherein the roaming network initiated a Visitor Location Registry (VLR) of the roaming network based upon the generic call forwarding information, the another switch forwarding the call to the switch in response to the indication that the roaming network has dropped the call, wherein the generic number is provided to the roaming network from a home location register along with generic call forwarding information, the generic call forwarding information being predetermined without a particular subscriber's preferences.

12. The switch of claim 11, further comprising:
logic that, when applied to the processor, results in the switch dropping the call after receiving an indication that the call was dropped after being answered.

* * * * *